United States Patent
Kizaki et al.

(10) Patent No.: US 10,236,531 B2
(45) Date of Patent: Mar. 19, 2019

(54) POWDER FOR NEGATIVE ELECTRODE OF LITHIUM ION SECONDARY BATTERY, AND METHOD FOR PRODUCING SUCH POWDER

(71) Applicant: OSAKA TITANIUM TECHNOLOGIES CO., LTD., Amagasaki-shi, Hyogo (JP)

(72) Inventors: Shingo Kizaki, Amagasaki (JP); Yusuke Kashitani, Amagasaki (JP); Kohki Takeshita, Amagasaki (JP)

(73) Assignee: OSAKA TITANIUM TECHNOLOGIES CO., LTD., Hyogo (JP)

( * ) Notice: Subject to any disclaimer, the term of this patent is extended or adjusted under 35 U.S.C. 154(b) by 0 days.

(21) Appl. No.: 15/524,691

(22) PCT Filed: Dec. 7, 2015

(86) PCT No.: PCT/JP2015/006051
§ 371 (c)(1),
(2) Date: May 5, 2017

(87) PCT Pub. No.: WO2016/098306
PCT Pub. Date: Jun. 23, 2016

(65) Prior Publication Data
US 2018/0309160 A1    Oct. 25, 2018

(30) Foreign Application Priority Data

Dec. 15, 2014 (JP) ................. 2014-253394

(51) Int. Cl.
*H01M 4/38* (2006.01)
*H01M 10/05* (2010.01)
(Continued)

(52) U.S. Cl.
CPC ......... *H01M 10/0525* (2013.01); *C01B 33/20* (2013.01); *H01M 4/386* (2013.01);
(Continued)

(58) Field of Classification Search
None
See application file for complete search history.

(56) References Cited

U.S. PATENT DOCUMENTS

| | | | |
|---|---|---|---|
| 2006/0046142 A1* | 3/2006 | Kasai ................... | H01M 4/131 429/223 |
| 2014/0322606 A1* | 10/2014 | Lee ...................... | H01M 4/366 429/222 |
| 2017/0149050 A1* | 5/2017 | Hirose .................. | H01M 4/36 |

FOREIGN PATENT DOCUMENTS

| JP | 4207055 | 1/2009 |
|---|---|---|
| JP | 4702510 | 6/2011 |

(Continued)

*Primary Examiner* — Scott J. Chmielecki
(74) *Attorney, Agent, or Firm* — Clark & Brody

(57) ABSTRACT

This invention provides a powder for a negative electrode of a lithium ion secondary battery, which is a powder that includes a silicon oxide powder containing Li. When a molar ratio between Li, Si and O is taken as y:1:x, the average composition of the powder overall satisfies the relation $0.5<x<1.5$ and the relation $0.1<y/x<0.8$. The volume median diameter of the powder for a negative electrode is within a range from 0.5 to 30 μm. When X-ray diffraction measurement of the powder is performed using a Cu $K_\alpha$ ray, a relation $P2/P1 \leq 1.0$ and a relation $P3/P1 \leq 1.0$ are satisfied, where P1 represents a height of a peak attributed to $Li_2SiO_3$, P2 represents a height of a peak attributed to crystalline Si, and P3 represents a height of a peak attributed to $Li_4SiO_4$.

8 Claims, 1 Drawing Sheet

(51) Int. Cl.
*H01M 10/0525* (2010.01)
*C01B 33/20* (2006.01)
*H01M 10/04* (2006.01)
*H01M 4/485* (2010.01)

(52) U.S. Cl.
CPC ......... *H01M 4/485* (2013.01); *H01M 10/045* (2013.01); *C01P 2006/12* (2013.01)

(56) References Cited

FOREIGN PATENT DOCUMENTS

| | | |
|---|---|---|
| JP | 5549982 | 7/2014 |
| WO | 2014/188654 | 11/2014 |

\* cited by examiner ized by the general formula $SiO_x$ ($0<x<2$), and is obtained, for example, by cooling and

POWDER FOR NEGATIVE ELECTRODE OF LITHIUM ION SECONDARY BATTERY, AND METHOD FOR PRODUCING SUCH POWDER

TECHNICAL FIELD

This invention relates to a powder for a negative electrode of a lithium ion secondary battery and a method for producing such powder, and more particularly relates to a powder for a negative electrode that includes silicon oxide containing lithium and a method for producing such powder.

BACKGROUND ART

In recent years, accompanying the remarkable development of portable electronic devices and communication devices and the like, from the viewpoint of cost efficiency and reducing the weight and size of such devices, there is a strong demand for the development of secondary batteries that have a high energy density. Currently, nickel-cadmium batteries, nickel-metal hydride batteries, lithium ion secondary batteries and polymer batteries and the like are available as secondary batteries that have a high energy density. Among these batteries, lithium ion secondary batteries have a particularly longer service life and a particularly higher capacity compared to nickel-cadmium batteries and nickel-metal hydride batteries, and the demand for lithium ion secondary batteries is therefore increasing in the power supply market.

FIG. 1 is a view illustrating a configuration example of a coin-shaped lithium ion secondary battery. As illustrated in FIG. 1, the lithium ion secondary battery includes a positive electrode 1, a negative electrode 2, a separator 3 that is impregnated with an electrolyte, and a gasket 4 that maintains electrical insulation between the positive electrode 1 and the negative electrode 2 and seals the contents within the battery. When charging and discharging is performed, lithium ions move back and forth between the positive electrode 1 and the negative electrode 2 through the electrolyte in the separator 3.

The positive electrode 1 includes a counter electrode case 1a, a counter electrode current collector 1b, and a counter electrode 1c. Lithium cobalt oxide ($LiCoO_2$) or lithium-manganese spinel ($LiMn_2O_4$) is mainly used for the counter electrode 1c. The negative electrode 2 includes a working electrode case 2a, a working electrode current collector 2b and a working electrode 2c. A negative electrode material that is used for the working electrode 2c generally includes an active material (negative electrode active material) that can occlude and release lithium ions, a conductive additive and a binder (a binding agent made from resin). These materials are kneaded together with water or an organic solvent to prepare a slurry. The slurry is applied onto the working electrode current collector 2b (for example, a component made from copper foil) and dried to thereby form the working electrode 2c.

Although a carbon-based material has conventionally been used as the negative electrode active material for lithium ion secondary batteries, in order to increase the capacity of lithium ion secondary batteries, attempts have been made to use materials that occlude and release a larger amount of lithium ions in comparison to a carbon-based material as the negative electrode active material. Silicon oxide may be mentioned as one example of such a material. Silicon oxide is represented by the general formula $SiO_x$ ($0<x<2$), and is obtained, for example, by cooling and depositing silicon monoxide vapor that is generated by heating a mixture of silicon dioxide and silicon. The silicon oxide obtained by such a method includes many amorphous portions.

Silicon oxide occludes and releases a large amount of lithium ions in comparison to a carbon-based material. For example, silicon oxide has a discharge capacity that is approximately five times the discharge capacity of graphite. Therefore, if silicon oxide is used in the working electrode 2c as a negative electrode active material, it is expected that the charge/discharge capacity as a lithium ion secondary battery can be increased. However, it is known that the initial efficiency (ratio of the initial discharge capacity to the initial charge capacity) of the working electrode 2c that uses silicon oxide is as low as about 70%.

To improve the initial efficiency of a lithium ion secondary battery that uses silicon oxide for the working electrode 2c, for example, in Patent Literature 1 that is described below, the use of silicon oxide that has a large proportion of Si relative to O (oxygen) is attempted, while in Patent Literatures 2 and 3 that are described below it is attempted to dope Li into silicon oxide. According to Patent Literature 2, Li is doped into silicon oxide by means of thermal diffusion, while according to Patent Literature 3 Li is doped into silicon oxide by mechanical alloying.

The reason that the initial efficiency of a lithium ion secondary battery improves as a result of doping with Li is as follows. In a case where silicon oxide that has not been doped with Li is used as the negative electrode material, during charging of the lithium ion secondary battery the silicon oxide occludes lithium ions and lithium silicate is formed. Multiple kinds of lithium silicate may possibly be formed. Among such multiple kinds of lithium silicate, some kinds of lithium silicate decompose and release lithium ions, while other kinds do not decompose and do not release lithium ions during discharging of a lithium ion secondary battery.

As a result of the formation of lithium silicate that does not release lithium ions, the initial discharge capacity decreases, that is, an irreversible capacity arises. By doping Li into silicon oxide in advance so that the powder for a negative electrode includes lithium silicate, formation of lithium silicate that does not release lithium ions during charging of a lithium ion secondary battery can be suppressed, and an irreversible capacity can be reduced.

CITATION LIST

Patent Literature

Patent Literature 1: Japanese Patent Publication No. 4207055
Patent Literature 2: Japanese Patent Publication No. 4702510
Patent Literature 3: Japanese Patent Publication No. 5549982

SUMMARY OF INVENTION

Technical Problem

However, in the case of each of the methods described in Patent Literatures 1 to 3, crystals of Si (hereunder, referred to as "crystalline Si") precipitate within the silicon oxide. The crystalline Si expands and contracts intensely during charging of the relevant lithium ion secondary battery. In accompaniment therewith, the working electrode is liable to detach from the working electrode current collector and therefore electrical conduction is liable to be lost between particles constituting the working electrode. Consequently, the capacity retention rate (ratio of the charge capacity after repeating charging/discharging with respect to the initial charge capacity) over a long-term cycle of the lithium ion secondary battery decreases.

Therefore, an object of the present invention is to provide a powder for a negative electrode of a lithium ion secondary battery that can increase the initial efficiency and the capacity retention rate over a long-term cycle when used in a negative electrode of a lithium ion secondary battery, and a method for producing the powder.

Solution to Problem

Aspects of the present invention provide a powder for a negative electrode according to the following (1), and a method for producing a powder for a negative electrode according to the following (2).

(1) A powder for a negative electrode of a lithium ion secondary battery, including:
 a silicon oxide powder containing Li; wherein:
 when a molar ratio between Li, Si and O is taken as y:1:x, an average composition of the powder overall satisfies a relation $0.5<x<1.5$ and a relation $0.1<y/x<0.8$;
 a volume median diameter of the powder for the negative electrode is within a range of 0.5 to 30 μm; and
 when an X-ray diffraction measurement using a Cu $K_\alpha$ ray is performed with respect to the powder, the powder satisfies a relation $P2/P1 \le 1.0$ and a relation $P3/P1 \le 1.0$, where P1 represents a height of a peak attributed to $Li_2SiO_3$ that appears in a range in which a diffraction angle 2θ is from 18.0 to 20.0°, P2 represents a height of a peak attributed to crystalline Si that can appear in a range in which the diffraction angle 2θ is from 27.4 to 29.4°, and P3 represents a height of a peak attributed to $Li_4SiO_4$ that can appear in a range in which the diffraction angle 2θ is from 21.5 to 22.5°.

(2) A production method for producing a powder for a negative electrode of a lithium ion secondary battery, including:
 a first mixing step of mixing a silicon oxide powder for which a molar ratio between Si and O is $1:x_1$ ($0.5<x_1<1.5$) and a lithium compound powder to obtain a first mixed powder;
 a first preliminary calcination step of calcining the first mixed powder at a preliminary calcination temperature that is a temperature that is 30 to 200° C. lower than a decomposition temperature of the lithium compound powder; and
 a first main calcination step of, after the first preliminary calcination step, calcining the first mixed powder at a main calcination temperature within a temperature range from 450 to 700° C.

Advantageous Effects of Invention

The powder for a negative electrode of the present invention includes silicon oxide containing Li, and therefore when the powder is used for a negative electrode of a lithium ion secondary battery, the powder can increase the initial efficiency of the lithium ion secondary battery. Further, a value of P2/P1 of the powder for a negative electrode is 1.0 or less, and hence the amount of crystalline Si in the powder is small. Therefore, when the powder for a negative electrode is used as a negative electrode of a lithium ion secondary battery, the capacity retention rate over a long-term cycle of the lithium ion secondary battery is high. The fact that the value of P3/P1 is 1.0 or less, that is, the fact that the proportion of $Li_4SiO_4$ is small, serves as an indicator that indicates that there is little crystalline Si.

Further, $Li_4SiO_4$ has a high solubility with respect to water. Because of the small proportion of $Li_4SiO_4$ in the powder for a negative electrode of the present invention, the resistance to water thereof is high. Therefore, the powder for a negative electrode of the present invention can be made into a slurry using an aqueous binder for forming a negative electrode.

According to the production method of the present invention, a powder can be produced in which formation of crystalline Si is suppressed, and when used for a negative electrode of a lithium ion secondary battery, the powder can increase the initial efficiency as well as the capacity retention rate over a long-term cycle.

DESCRIPTION OF EMBODIMENTS

Figure 1:
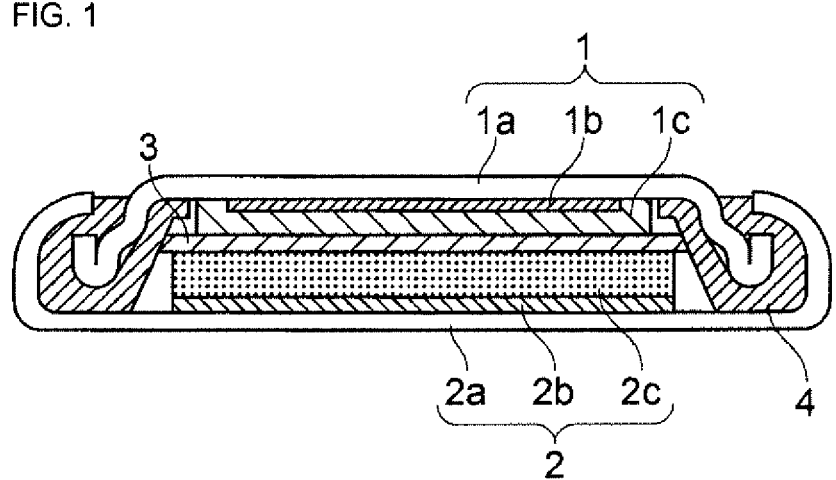
FIG. 1 is a view illustrating a configuration example of a coin-shaped lithium ion secondary battery.

The present inventors found that crystalline Si precipitates at a progressively lower temperature as the amount of Li doped into a silicon oxide powder increases, and also found that a silicon oxide powder containing Li that is a silicon oxide powder containing a high proportion of $Li_4SiO_4$ tends to contain a high proportion of crystalline Si.

A silicon oxide powder containing Li is obtained by, for example, mixing silicon oxide and a lithium compound powder that serves as a supply source of Li with respect to the silicon oxide, and calcining (heat-treating) the resultant mixed powder. $Li_2Si_2O_5$, $Li_2SiO_3$, and $Li_4SiO_4$ may be mentioned as examples of lithium silicate that can be formed at such time.

When a mixed powder of a silicon oxide powder and a lithium compound powder are rapidly heated, lithium silicate in which the proportion of Li to Si is high, that is, $Li_4SiO_4$, which is generated by a sudden reaction with Li is formed in the vicinity of the surface of particles constituting the silicon oxide powder (hereunder, also referred to as "silicon oxide particles"). The average composition of the silicon oxide powder is, for example, $SiO_x$ ($0.5<x<1.5$), and at the time when $Li_4SiO_4$ is formed a large amount of O is consumed in comparison to Si. As a result, in the silicon oxide, surplus Si that does not bind with O occurs as crystalline Si. Since crystalline Si is stable, once crystalline Si is formed, it is difficult for the crystalline Si to return to Si that constitutes amorphous silicon oxide.

Further, when the surface of the silicon oxide particles is covered with $Li_4SiO_4$, it is difficult for Li to diffuse into the interior of the silicon oxide particles. Therefore, concentration of Li in the vicinity of the surface of the silicon oxide particles is promoted. As a result, the amount of crystalline Si increases during calcination.

Therefore, as a measure for obtaining an Li-doped silicon oxide powder that contains Li and contains a low proportion of crystalline Si (or does not substantially contain crystalline Si), it is conceivable to suppress the formation of $Li_4SiO_4$ when producing the powder.

The present invention has been completed based on the above findings.

As described above, a powder for a negative electrode of the present invention is a powder for a negative electrode of a lithium ion secondary battery, and includes a silicon oxide powder containing Li. When a molar ratio between Li, Si and O is taken as y:1:x, an average composition of the powder overall satisfies a relation $0.5<x<1.5$ and a relation $0.1<y/x<0.8$. A volume median diameter of the powder for a negative electrode is within a range of 0.5 to 30 When an X-ray diffraction measurement using a Cu $K_\alpha$ ray is performed with respect to the powder, the powder satisfies a relation $P2/P1 \le 1.0$ and a relation $P3/P1 \le 1.0$, where P1 represents a height of a peak attributed to $Li_2SiO_3$ that appears in a range in which a diffraction angle $2\theta$ is from 18.0 to 20.0°, P2 represents a height of a peak attributed to crystalline Si that can appear in a range in which the diffraction angle $2\theta$ is from 27.4 to 29.4°, and P3 represents a height of a peak attributed to $Li_4SiO_4$ that can appear in a range in which the diffraction angle $2\theta$ is from 21.5 to 22.5°.

With respect to the molar ratio x of O to Si, as a characteristic of a lithium ion secondary battery (hereunder, may also be referred to as simply "battery") having a negative electrode that uses the powder of the present invention, if $x \le 0.5$, the capacity retention rate decreases, while if $1.5 \le x$, the capacity and the initial efficiency decrease. Therefore, x is made a value such that $0.5<x<1.5$. Preferably, x is made a value such that $0.7<x<1.1$.

With respect to the molar ratio y/x of Li to O, if $y/x \le 0.1$, an effect that improves the initial efficiency of the battery relative to a case where a silicon oxide powder that does not contain Li is used is not adequately obtained, while if $0.8 \le y/x$, the amount of lithium silicate will be too great in comparison to the amount of silicon oxide and consequently, when manufacturing the negative electrode, a reaction will occur with the binder and preparation of a slurry will be difficult. Therefore, y/x is made a value such that $0.1<y/x<0.8$. Preferably, y/x is made a value such that $0.3<y/x<0.7$.

The volume median diameter ($D_{50}$) is a particle diameter at a cumulative 50% from the fine particle side (or coarse particle side) of a volume-based cumulative particle size distribution, and for example, can be measured by a laser diffraction particle size distribution measurement apparatus. By making the volume median diameter of the powder a size within a range from 0.5 to 30 μm, a slurry can be obtained in which the powder is dispersed evenly and that has a viscosity that is suitable for application onto a working electrode current collector. Further, by the volume median diameter being 0.5 μm or more, when the powder is used for a negative electrode of a lithium ion secondary battery, the occurrence of a situation in which the electrolyte reacts with the surface of particles constituting the negative electrode and shortens the service life of the battery can be suppressed.

Preferably, the volume median diameter of the powder is within a range of 0.5 to 15 μm, and in this case a BET specific surface area is preferably 0.5 to 15 $m^2/g$. In this case, the dispersibility and application properties of the slurry can be made more favorable.

In the present invention, a height P1 of a peak attributed to $Li_2SiO_3$ is a height obtained by subtracting a base intensity from the intensity of the peak. The intensity of a peak attributed to $Li_2SiO_3$ is taken as a maximum value of the diffraction intensity when the diffraction angle $2\theta$ is in a range from 18.0 to 20.0°. The base intensity that is to be subtracted from the intensity of a peak attributed to $Li_2SiO_3$ is taken as an intensity when the diffraction angle $2\theta=19.0°$ that is on a straight line linking a diffraction intensity at a diffraction angle $2\theta$ of 17.4° and a diffraction intensity at a diffraction angle $2\theta$ of 20.4°.

In the present invention, a height P2 of a peak attributed to crystalline Si is a height obtained by subtracting a base intensity from the intensity of the peak. The intensity of a peak attributed to crystalline Si is taken as a maximum value of the diffraction intensity when the diffraction angle $2\theta$ is in a range from 27.4 to 29.4°. The base intensity that is to be subtracted from the intensity of a peak attributed to crystalline Si is taken as an intensity when the diffraction angle $2\theta=28.4°$ that is on a straight line linking a diffraction intensity at a diffraction angle $2\theta$ of 27.1° and a diffraction intensity at a diffraction angle $2\theta$ of 29.5°.

In the present invention, a height P3 of a peak attributed to $Li_4SiO_4$ is a height obtained by subtracting a base intensity from the intensity of the peak. The intensity of a peak attributed to $Li_4SiO_4$ is taken as a maximum value of the diffraction intensity when the diffraction angle $2\theta$ is in a range from 21.5 to 22.5°. The base intensity that is to be subtracted from the intensity of a peak attributed to $Li_4SiO_4$ is taken as an intensity at a diffraction angle of a peak attributed to $Li_4SiO_4$ in the range from 21.5 to 22.5° that is on a straight line linking a diffraction intensity at a diffraction angle $2\theta$ of 21.4° and a diffraction intensity at a diffraction angle $2\theta$ of 22.6°.

In this powder, $P2/P1 \le 1.0$, and hence the proportion of crystalline Si to the amount of $Li_2SiO_3$ is small. Therefore, the capacity retention rate over a long-term cycle (for example, 500 cycles) of a battery in which the powder is used for a negative electrode is high. To obtain this effect, it is preferable that $P2/P1 \le 0.5$, and more preferably that $P2/P1 \le 0.1$.

In this powder, $P3/P1 \le 1.0$, and hence the proportion of $Li_4SiO_4$ to the amount of $Li_2SiO_3$ is small. As described later, by producing this powder under conditions such that $P3/P1 \le 1.0$, the content ratio of crystalline Si can be made small.

An electrically conductive carbon film may be formed on at least one portion of the surface of particles constituting the powder. In this case, at a negative electrode (working electrode) that uses the powder, it is easy to obtain electrical conduction between particles constituting the negative electrode and between the working electrode current collector and the negative electrode, and the capacity retention rate over a long-term cycle of the battery can be improved.

As described above, a production method for producing a powder for a negative electrode of the present invention includes a first mixing step, a first preliminary calcination step, and a first main calcination step. In the first mixing step, a silicon oxide powder for which the molar ratio between Si and O is $1:x_1$ ($0.5<x_1<1.5$) and a lithium compound powder are mixed to obtain a first mixed powder. In the first preliminary calcination step, the first mixed powder is calcined at a preliminary calcination temperature that is a temperature that is 30 to 200° C. lower than a decomposition temperature of the lithium compound powder. In the first main calcination step, after the first preliminary calcination step, the first mixed powder is calcined at a main calcination temperature that is within a temperature range of 450 to 700° C.

By means of this production method, Li can be doped into a silicon oxide powder, and the powder for a negative electrode of the present invention can be produced.

Lithium hydride (LiH), lithium oxide ($Li_2O$), lithium hydroxide (LiOH), lithium carbonate ($Li_2CO_3$) or the like can be used as the lithium compound. Among these, lithium hydride is preferably used since there are few by-products and, as a battery characteristic, a decrease in capacity is reduced.

The decomposition temperature of the lithium compound powder is a decomposition temperature that is evaluated by differential thermal analysis (DTA), and specifically is taken as a temperature at which heat generation or heat absorption starts.

In the first preliminary calcination step, the first mixed powder that is obtained by mixing the silicon oxide powder and the lithium compound powder is calcined at a preliminary calcination temperature that is 30 to 200° C. lower than the decomposition temperature of the relevant lithium compound powder. At the preliminary calcination temperature, the lithium compound gradually decomposes, and the Li constituting the lithium compound and the silicon oxide powder gradually react. Consequently, Li is not concentrated on the surface of the silicon oxide particles and it is easy to cause the Li to diffuse as far as the interior of the silicon oxide powder. By this means, formation of $Li_4SiO_4$ is suppressed, and thus the formation of crystalline Si can be suppressed. When the decomposition temperature of the lithium compound is high (for example, 600° C. or more), in order to obtain the aforementioned effect it is preferable to make the preliminary calcination temperature lower by 50 to 200° C. than the decomposition temperature of the lithium compound.

In the first main calcination step, Li is evenly diffused inside the silicon oxide particles.

Preferably, the present production method further includes a second mixing step, a second preliminary calcination step and a second main calcination step. In the second mixing step, after the first main calcination step, a lithium compound powder is added to the first mixed powder and mixed to obtain a second mixed powder. In the second preliminary calcination step, the second mixed powder is calcined at the preliminary calcination temperature. In the second main calcination step, after the second preliminary calcination step, the second mixed powder is calcined at the main calcination temperature.

In this case, the amount of Li that is to be ultimately doped into the silicon oxide powder is added by dividing the addition of the relevant Li amount between the first mixing step and the second mixing step. By this means, the degree of concentration of Li on the surface of the silicon oxide particles can be lowered, and formation of $Li_4SiO_4$ and crystalline Si can be further reduced.

In a case where the present production method includes a second mixing step, a second preliminary calcination step and a second main calcination step, when the molar ratio between O of the silicon oxide powder and Li of the lithium compound powder that are mixed in the first mixing step is taken as $x_1:y_1$ and the molar ratio between O of the first mixed powder and Li of the lithium compound powder that are mixed in the second mixing step is taken as $x_2:y_2$, preferably a relation $0.5 \geq y_1/x_1 > y_2/x_2$ is satisfied.

That is, in the case of dividing the lithium compound into two parts and adding the two parts in separate addition operations, when adding the first part, the lithium compound is added in an amount such that the molar ratio $y_1/x_1$ of Li of the lithium compound to O of the silicon oxide is 0.5 or less. Further, when adding the second part, the lithium compound is added in an amount such that the proportion of Li to O is less than in the lithium compound that is added when adding the first part. By this means, the degree of concentration of Li at the surface of the silicon oxide particles can be further lowered, and formation of $Li_4SiO_4$ and crystalline Si can be suppressed to an even smaller amount.

The lithium compound powder may be added by dividing addition thereof into n (3≤n) or more operations, and in such a case, preferably, the production method further includes:

an $i^{th}$ mixing step of, after the $(i-1)^{th}$ main calcination step, adding the lithium compound powder to a $(i-1)^{th}$ mixed powder, and mixing to obtain an $i^{th}$ mixed powder;

an $i^{th}$ preliminary calcination step of calcining the mixed powder at the preliminary calcination temperature; and an $i^{th}$ main calcination step of, after the preliminary calcination step, calcining the $i^{th}$ mixed powder at the main calcination temperature.

Where, i is an integer such that 3≤i≤n, and when n>3, the $i^{th}$ mixing step, the $i^{th}$ preliminary calcination step and the $i^{th}$ main calcination step are executed in a manner so that i takes a value of all integers from 3 to n.

In this case, when the molar ratio between O of the $(i-1)^{th}$ mixed powder and Li of the lithium compound powder that are mixed in the $(i-1)^{th}$ mixing step is taken as and the molar ratio between O of the $i^{th}$ mixed powder and Li of the lithium compound powder that are mixed in the $i^{th}$ mixing step is taken as $x_i:y_i$, preferably a relation $y_{i-1}/x_{i-1} > y_i/x_i$ is satisfied.

If the value of n is increased, although an effect that obtains the silicon oxide evenly doped with Li and that suppresses the generation of $Li_4SiO_4$ and crystalline Si increases, the production cost rises. In consideration of this fact, preferably the mixing step, preliminary calcination step and main calcination step are performed, for example, twice or three times.

Figure 2:
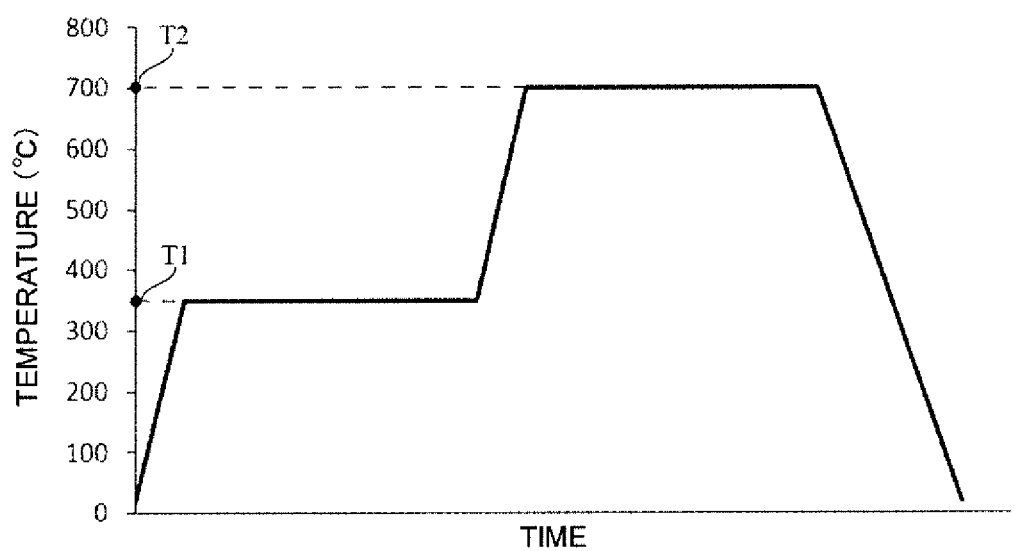
FIG. 2 is a view illustrating a temperature increase/decrease pattern with respect to a preliminary calcination step and a main calcination step in a production method according to one embodiment of the present invention.

FIG. 2 is a view illustrating a temperature increase/decrease pattern with respect to the preliminary calcination step and the main calcination step in the production method according to an embodiment of the present invention. The preliminary calcination step and the main calcination step can be executed using, for example, a resistance heating furnace such as a rotary kiln. Preferably, the atmosphere inside the furnace is made an inert gas (for example, Ar) atmosphere and heated. This is done to suppress the occurrence of a situation in which the powder that is the heating target oxidizes and the ratio between O and Si thereof deviates from a predetermined value.

At a preliminary calcination temperature T1, the temperature is maintained for a time period that is required for the lithium compound to adequately decompose. At a main calcination temperature T2 (temperature within a range from 450 to 700° C.), the temperature is maintained for a time period that is required for Li to adequately diffuse evenly in the silicon oxide powder. To reduce the production cost, after the preliminary calcination step it is preferable not to lower the temperature and to raise the temperature as far as the main calcination temperature and execute the main calcination step. To avoid oxidation of the contents of the furnace, preferably the contents of the furnace are taken out when the temperature inside the furnace becomes 200° C. or less.

Hereunder, an example of the temperature increase/decrease pattern is described with respect to a case where LiH is used as the lithium compound. The temperatures, rate of temperature increase, holding times, and rate of temperature decrease described below represent one example, and the production method of the present invention is not limited to the temperatures, rate of temperature increase, holding times, and rate of temperature decrease described below. The decomposition temperature of LiH is 380° C., and therefore in this case the preliminary calcination temperature T1 can be set to, for example, a temperature between 330 and 350° C. The temperature rises at a rate of temperature increase of, for example, 0.1 to 5° C./min from the time that the temperature starts to increase until the preliminary calcination temperature T1 is reached. The temperature is held at the preliminary calcination temperature T1 for, for example, one to five hours. The temperature rises at a rate of temperature increase of, for example, 0.1 to 5° C./min from the preliminary calcination temperature T1 to the main calcination temperature T2. The temperature is held at the main calcination temperature T2 for, for example, 1 to 200 hours. After the main calcination step ends, the temperature decreases at a rate of temperature decrease of, for example, 0.5 to 5° C./minutes.

EXAMPLES

To confirm the effects of the present invention, silicon oxide powders containing Li were prepared, lithium ion secondary batteries (full cell) were prepared using the silicon oxides for negative electrodes, and the characteristics of the batteries were evaluated. Table 1 shows the production conditions for the silicon oxide powders.

ratio y/x of Li to O was determined. The O content percentage was measured using the inert gas fusion infrared absorption method (GFA). The Li content percentage was measured by ICP (inductively coupled plasma) optical emission spectrometry.

The values for y/x, P2/P1 and P3/P1 are shown in Table 2.

TABLE 2

| Section | y/x | P2/P1 | P3/P1 | Initial Discharge Capacity (mAh/g) | Initial Efficiency (%) | Capacity Maintenance Rate (%) |
|---|---|---|---|---|---|---|
| Example 1 | 0.48 | 0.73 | 0.1 | 1650 | 79.3 | 76.1 |
| Example 2 | 0.72 | 0 | 0.2 | 1650 | 88.2 | 85.5 |
| Example 3 | 0.51 | 0.5 | 0.0 | 1685 | 81.7 | 77.8 |
| Example 4 | 0.49 | 0 | 0.0 | 1720 | 80.5 | 82.0 |
| Comparative Example 1 | 0.45 | 1.0 | 0.6 | 1664 | 80.4 | 62.3 |
| Comparative Example 2 | 0.78 | 10.1 | 1.0 | 1620 | 88.7 | 40.2 |

TABLE 1

| Section | First Mixing Step $y_1/x_1$ | First Preliminary Calcination Step Preliminary Calcination Temperature (° C.) | First Main Calcination Step Main Calcination Temperature (° C.) | Second Mixing Step $y_2/x_2$ | Second Preliminary Calcination Step Preliminary Calcination Temperature (° C.) | Second Main Calcination Step Main Calcination Temperature (° C.) | Third Mixing Step $y_3/x_3$ | Third Preliminary Calcination Step Preliminary Calcination Temperature (° C.) | Third Main Calcination Step Main Calcination Temperature (° C.) |
|---|---|---|---|---|---|---|---|---|---|
| Example 1 | 0.5 | 350 | 700 | — | — | — | — | — | — |
| Example 2 | 0.3 | 350 | 700 | 0.25 | 350 | 600 | 0.2 | 350 | 600 |
| Example 3 | 0.2 | 350 | 700 | 0.1 | 350 | 600 | 0.2 | 350 | 600 |
| Example 4 | 0.3 | 350 | 700 | 0.2 | 350 | 600 | — | — | — |
| Comparative Example 1 | 0.5 | — | 700 | — | — | — | — | — | — |
| Comparative Example 2 | 0.8 | — | 900 | — | — | — | — | — | — |

A lithium hydride powder was used as the lithium compound powder. The preliminary calcination step and main calcination step were performed under an Ar atmosphere using a rotary kiln. The mixing step, preliminary calcination step, and main calcination step were performed only once in Example 1, were performed three times in Examples 2 and 3, and were performed twice in Example 4. In both Comparative Examples 1 and 2, only one main calcination step was performed, and a preliminary calcination step was not performed. A holding time at the preliminary calcination temperature was set to six hours in each of the Examples. A holding time at the main calcination temperature was set to 12 hours in each of the Examples and in Comparative Example 1, and was set to four hours in Comparative Example 2.

X-ray diffraction measurement using a Cu $K_\alpha$ ray was performed on the silicon oxide powders of the respective Examples and Comparative Examples, and a height P1 of a peak attributed to $Li_2SiO_3$, a height P2 of a peak attributed to crystalline Si, and a height P3 of a peak attributed to $Li_4SiO_4$ were determined for each of the silicon oxide powders. When determining the peaks P1, P2 and P3, a base intensity was subtracted from the intensity of the relevant peak in accordance with the method described above.

Further, the content percentage of Li and O of each powder was measured by chemical analysis, and a molar Batteries (full cell) were manufactured by the following method using the powders of the respective Examples and Comparative Examples. Respective slurries containing the respective powders were applied to copper foils having a thickness of 10 as a working electrode current collector and thereafter, under atmosphere (air), were dried at 80° C. for 15 minutes followed by drying at 120° C. for two hours to obtain working electrodes. The respective slurries were prepared by preparing an aqueous solution by adding ion exchanged water in a suitable amount to styrene-butadiene rubber and carboxymethyl cellulose, and then mixing into the aqueous solution the powder for a negative electrode, acetylene black, styrene-butadiene rubber (SBR) and carboxymethyl cellulose so that the mass ratio therebetween became 96.5:1:1.5:1.5. Thereafter, the working electrode current collector and working electrode were punched in a size of 1 cm² (1 cm×1 cm) to obtain a negative electrode.

The respective batteries were manufactured by using the relevant negative electrode described above and foil made of lithium cobalt oxide as a counter electrode, and disposing a separator formed of a polyethylene porous film having a thickness of 30 μm that was impregnated with an electrolyte between the negative electrode and the counter electrode. A solution obtained by dissolving lithium hexafluorophosphate ($LiPF_6$) at a concentration of 1 mol/L in a liquid obtained by mixing ethylene carbonate and diethyl carbonate in a 1:1 volume ratio was adopted as the electrolyte.

The initial charge capacity and initial discharge capacity of the obtained battery were measured to determine the initial efficiency. Further, the charge capacity of the battery after performing a charge-discharge test of 500 cycles was measured and the capacity retention rate was determined. The values for the initial discharge capacity, initial efficiency and the capacity retention rate are shown in Table 2.

There was a tendency for the initial efficiency to increase as the value of y/x increases. That is, it was found that the initial efficiency can be improved by increasing the Li content percentage of the powder.

It was found that, in comparison to the powders (Examples 1 to 4) for which preliminary calcination was performed, in the powders (Comparative Examples 1 and 2) for which preliminary calcination was not performed, the values for P2/P1 and P3/P1 were greater and large amounts of crystalline Si and $Li_4SiO_4$ were formed. In the powders in which formation of $Li_4SiO_4$ was suppressed, crystalline Si was not formed or was formed in a very small amount. The capacity retention rate of the powders for which preliminary calcination was performed was improved by a large amount in comparison to the powders for which preliminary calcination was not performed.

In the Examples, there was a tendency for the capacity retention rate to increase in accordance with an increase in the number of times that mixing, preliminary calcination and main calcination were performed. However, in Example 3, the capacity retention rate was lower than the capacity retention rate in Examples 2 and 4. It is considered that the reason was that, in Example 3, $y_3/x_3$ was larger than $y_2/x_2$.

The invention claimed is:

1. A powder for a negative electrode of a lithium ion secondary battery, comprising:
   a silicon oxide powder containing Li;
   wherein:
   when a molar ratio between Li, Si and O is taken as y:1:x, an average composition of the powder overall satisfies a relation $0.5<x<1.5$ and a relation $0.1<y/x<0.8$;
   a volume median diameter of the powder for the negative electrode is within a range of 0.5 to 30 μm; and
   when an X-ray diffraction measurement using a Cu $K_\alpha$ ray is performed with respect to the powder, the powder satisfies a relation $P2/P1 \leq 1.0$ and a relation $P3/P1 \leq 1.0$, where P1 represents a height of a peak attributed to $Li_2SiO_3$ that appears in a range in which a diffraction angle 2θ is from 18.0 to 20.0°, P2 represents a height of a peak attributed to crystalline Si that can appear in a range in which the diffraction angle 2θ is from 27.4 to 29.4°, and P3 represents a height of a peak attributed to $Li_4SiO_4$ that can appear in a range in which the diffraction angle 2θ is from 21.5 to 22.5°.

2. The powder according to claim 1, wherein:
   the powder satisfies a relation $P2/P1 \leq 0.5$.

3. The powder according to claim 1, wherein:
   the powder satisfies a relation $P2/P1 \leq 0.1$.

4. The powder for a negative electrode according to claim 1, wherein:
   an electrically conductive carbon film is formed on at least one portion of a surface of a particle constituting the powder.

5. The powder for a negative electrode according to claim 1, wherein:
   the volume median diameter of the powder is within a range of 0.5 to 15 μm, and
   a BET specific surface area of the powder is within a range of 0.5 to 15 $m^2/g$.

6. A production method for producing a powder for a negative electrode of a lithium ion secondary battery, comprising:
   a first mixing step of mixing a silicon oxide powder for which a molar ratio between Si and O is $1:x_1$ ($0.5<x_1<1.5$) and a lithium compound powder to obtain a first mixed powder;
   a first preliminary calcination step of calcining the first mixed powder at a preliminary calcination temperature that is a temperature that is 30 to 200° C. lower than a decomposition temperature of the lithium compound powder; and
   a first main calcination step of, after the first preliminary calcination step, calcining the first mixed powder at a main calcination temperature within a temperature range from 450 to 700° C.

7. The production method according to claim 6, further comprising:
   a second mixing step of, after the first main calcination step, adding a lithium compound powder to the first mixed powder and mixing to obtain a second mixed powder;
   a second preliminary calcination step of calcining the second mixed powder at the preliminary calcination temperature; and
   a second main calcination step of, after the second preliminary calcination step, calcining the second mixed powder at the main calcination temperature.

8. The production method according to claim 7, wherein:
   when a molar ratio between O of the silicon oxide powder and Li of the lithium compound powder that are mixed in the first mixing step is taken as $x_1:y_1$ and a molar ratio between O of the first mixed powder and Li of the lithium compound powder that are mixed in the second mixing step is taken as $x_2:y_2$, a relation $0.5 \geq y_1/x_1 > y_2/x_2$ is satisfied.

* * * * *